INVENTOR
Heinz Leiber

BY Spencer & Kaye
ATTORNEYS

INVENTOR
Heinz Leiber

BY Spencer & Kaye
ATTORNEYS

United States Patent Office 3,299,539
Patented Jan. 24, 1967

3,299,539
NAVIGATIONAL EQUIPMENT
Heinz Leiber, Leimen, Germany, assignor to Teldix Luftfahrt-Ausrustungs-G.m.b.H., Heidelberg-Wieblingen, Germany
Filed June 29, 1965, Ser. No. 468,031
Claims priority, application Germany, July 2, 1964, T 26,503
15 Claims. (Cl. 35—40)

The present invention relates to a piece of navigational equipment and, more particularly, to a map display device for indicating the position of a craft on a map.

There exist position indicating devices which themselves incorporate a map or maps that cover a relatively large geographical area but which, at any given time, display only that section of the area in which the craft is located. In the interests of clarity, these map sections are made to overlap each other. The indicating device is connected to a navigation computer which itself puts out the coordinates representing the position of the craft on the map and which controls an indicator, such as a marker, which points up the position of the craft on the map. When the craft is about to move out of the geographical area depicted by the particular map section being displayed, the marker will move toward the edge of the particular map section. As soon as the marker advanced into a given border zone, the map section is replaced by a new map section, i.e., the map section which depicts the adjacent geographical area into which the craft is headed. The new map section is exchanged either manually or automatically, and the position of the marker is adjusted to coincide with the new map section; that is to say, the position of the marker is adjusted so that it now correctly indicates the position of the craft on the new map section.

In order to facilitate an understanding of the prior art, and to allow a better appreciation of the present invention, reference is made to FIGURES 1 through 5 of the accompanying drawing, in which FIGURE 1 is a square showing a composite map of the entire geographic area within which the craft is to navigate. For purposes of visualizing the present invention, the craft may be considered to be an aircraft, although the present invention is not limited to airborne craft, but is equally applicable to ground vehicles and sea-going vessels. The map itself is divided into nine squares, identified by Roman numerals I through IX, and is itself surrounded by a border strip. FIGURE 2 shows the same squares I through IX, except that each is provided with a border strip, each border strip itself depicting regions that are also depicted on adjacent squares or on the border strip of the composite map. That is to say, the border strip of square IV, for example, will depict the center of the left portion of the border strip of the composite map as well as parts of squares I, II, V, VII and VIII. Here it should be noted that the individual map sections need not necessarily be square and the side of each section will hereinafter simply be referred to as $t$. The explanation of the invention is, however, simplified in the case where the sides of each map section are equal to each other, i.e., where $t_1 = t_2$ (see square VII in FIGURE 2).

FIGURES 3a and 3b are schematic representations of a map display device 1 provided with actuating knobs 2. The display device 1 has a display area or "sight" 3 within which the map section is visible. The sight 3 is square and has the same size as the map sections shown in FIGURE 2, including the respective borders. Within this sight there is the area 4, shown in phantom lines, this being the area within which the marker 5 can move to indicate the position of the craft. The area 4 which is not outlined or otherwise made known to the observer of the device, is equal in size to the size of each map section minus its respective border, i.e., the area 4 is a square which is equal in size to each of the squares I through IX. It will thus be appreciated that, while the observer will see the entire map section including its border strip— this being the area outlined by the frame which defines the sight 3—the marker 5 itself will move only within the area 4.

The identifying characteristic of a simple map change-over device, then, is that, as depicted in FIGURES 3a and 3b, the size of indicating area 4 is equal to the size $t$ of the map section proper, i.e., the map section minus its border strip. FIGURE 3a shows the device as displaying the map section V; if the craft then moves, over the geographical area depicted by map section V, to the point depicted on the map at the very right-hand edge of the section, the marker 5 will be in the position illustrated in FIGURE 3a. The map section V is now replaced by the map section VI, preferably automatically, and the marker 5 is shifted so as to appear, within the sight 3, at a point near the left-hand edge of the map section VI, as illustrated in FIGURE 3b. It will thus be appreciated that while the geographical position of the craft is essentially the same in both of FIGURES 3a and 3b, the marker 5 will have to occupy different positions with respect to the sight 3 of the display device.

The drawback of the above arrangement is that if the craft travels generally along the line at which two map sections join each other, and wanders back and forth across the line of demarcation between the two map sections, the map sections will continuously have to be exchanged. This not only subjects the apparatus to excessive wear, but is also likely to confuse the navigator who must constantly adjust himself to being shown a new map section.

It has been sought to avoid this drawback by making the size of the indicating area 4 greater than the dimension $t$ of the map section, as illustrated in FIGURES 4a and 4b, in which the map display device 1', provided with knobs 2' and having a sight 3' whose size is the same as that of the sight 3 of the device 1 of FIGURES 3a and 3b, has an indicating area 4' which is greater than the size of the map section proper, i.e., the length (or width) of the indicating area 4' is greater than the length (or width) $t$ of the map section, so that the marker 5' is movable over an area greater than the actual map section proper, i.e., the map section without its border strip. As in the case of the display of FIGURES 3a and 3b, the display device 1' is not provided with any means which give a visual indication to the observer of the size of the indicating area 4'.

FIGURE 4a shows the position of the marker 5' after the same has moved out of the actual map section area, i.e., into a position wherein it is within the border strip of the map section V. Assuming the craft to travel in a direction toward the geographic area depicted by the map section VI, the marker 5' will continue its rightward movement until it comes to the edge of the indicating area 4'. Only now will the new map section VI be put into view within the sight 3', as illustrated in FIGURE 4b, and the marker 5' will be shifted to the left by an amount equal to the distance $t$, so that the marker will not be at the very edge of the new map section VI but already well within the limits of the map section VI. Should, then, the craft proceed back toward the geographic area depicted by the map section V, the latter will not be placed into the sight 3' of the display device 1' until the marker 5' has reached the edge of the indicating area 4'. Consequently, even if the craft wanders along the line of demarcation between map sections V and VI, there will be no continuous shifting back and forth between the two map sections; the two map sections V and VI will be exchanged, one for the other, only if the craft makes relatively wide sweeps into each respective map section. The arrangement thus affords something in the nature of a "lost motion" effect.

It will be appreciated that, in practice, the craft will often travel a certain distance during the time it takes for one map section to be exchanged for another and for the position of the marker to be changed accordingly. Consequently, the path travelled during this time must, in some manner, be stored, and the stored value must then be used to correct the position of the marker after the map section exchange has been completed. The hardware capable of doing this is quite complicated and requires, for example, equipment such as a differential drive or the like. Therefore, it has been found simpler to obtain the correct indication by using more than one marker. In one known type of device, a plurality of markers are permanently coupled to each other so as to move in unison, the markers being spaced equal distances from each other, these distances being equal to the map section length (or width) $t$. The cluster of markers thus move together while one of them sweeps a given map section.

Such an arrangement is shown in FIGURE 5 which comprises two pairs of rollers 6, 7, and 8, 9, the same carrying endless transparent belts 10 and 11, respectively. The belt 10 carries a plurality of heavy black transverse lines 12, two of which are illustrated in FIGURE 5. The belt 11 carries similar transverse lines 13. The lines 12 are spaced the distance $t_1$ from each other, while the lines 13 are spaced the distance $t_2$ from each other (cf., FIGURE 2, wherein $t_1 = t_2$). Arranged approximately in the plane containing the axes of the four rollers is a white, opaque plate 14, so that when one looks down on the device of FIGURE 5 from above, a cross is formed, constituted by the intersection of one of the lines 12 and one of the lines 13, which cross may serve as the marker. The structure of FIGURE 5 may be modified by replacing the plate 14 by a luminous surface, by making the belts 10 and 11 of opaque material, and by replacing the lines 12 and 13 by slits, so that a light spot will be formed at the intersection of two slits, which light spot then serves as the marker.

The advantage of an arrangement such as is shown in FIGURE 5 is that the rollers can be driven continuously, as a function of the speed and heading of the craft, thereby to provide a "circulation" of markers. The indicating area is then masked, and whenever one marker (intersection of two lines or light spot) disappears at an edge of the indicating area, a new marker appears at the opposite edge. In this way, it is unnecessary to store the path covered by the craft during the time needed for the insertion of a new map section.

It will be appreciated that a device such as is shown in FIGURE 5, which produces a circulating series of markers, has the inherent drawback that it can be used only when the sight of the display area is no greater than $t$, i.e., no greater than the size of one map section without border strip, for otherwise more than one marker—for example, as many as four markers—may be seen in the sight at any one time.

It is, therefore, the primary object of the present invention to provide a map display device which incorporates the advantages of the "stable" system depicted in FIGURES 4a and 4b, i.e., a system in which map sections are not exchanged immediately when the marker reaches an edge of any one map section, as well as the advantages of an indicator device which produces a plurality of markers, thereby to obtain a display device which, in effect, combines the advantages of both.

Accordingly, the present invention resides in a map display device which comprises means for displaying any one of a plurality of map sections each of which has an overlap border which depicts portions of adjacent map sections, each map section having, in a given direction and exclusive of its overlap border, a predetermined length $t$. Means are also provided for producing a plurality of markers, spaced from each other, in this given direction, a distance equal to $t$, and for bringing these markers into registration with a map section being displayed by the display means. Further means are provided for moving the marker means, in this given direction, a distance greater than $t$, thereby to make it possible for more than one marker at a time to be brought into registration with a map section being displayed by the display means. According to the present invention, masking means are provided which are movable in this given direction and which are operatively connected with the moving means for preventing more than one marker at a time from being shown on a map section which is displayed by the display means.

Additional objects and advantages of the present invention will become apparent upon consideration of the following description when taken in conjunction with the accompanying drawings in which:

FIGURES 1 through 5, already referred to above, are relied on to facilitate an understanding of the prior art and an appreciation of the technological advance manifested by the present invention.

Referring once more to the drawings and now to FIGURES 6a through 6f thereof, the same again depict map sections of the type explained above in conjunction with FIGURE 1. In each of FIGURES 6a through 6f, a fragmentary portion of the masking means—hereinafter referred to simply as the mask—is shown at 15, this mask being mounted for movement in a plane parallel to the plane of the drawings and in the directions of the coordinates of the map. In each of FIGURES 6a, 6c and 6e, the mask 15 is shown as occupying the center or rest position in which it is symmetrical with respect to the particular map section being displayed. The indicating area is shown in FIGUE 6a only, at 16, while the actual sight or window opening of the mask is shown at 17. The markers may, for purposes of illustration, be considered as being constituted by light spots produced in the manner described above, i.e., by means of two mutually perpendicular and opaque belts which are provided with spaced apart slits, so that a light spot will be formed wherever two slits intersect each other. In each of FIGURES 6a through 6f, a marker which is shown by a black square (e.g., marker 18) represents a visible marker, i.e., a marker which falls within the sight 17 of the mask, while each marker which is shown by a white square (e.g., markers 19) represents an invisible marker, i.e., a marker which is outside of the sight and hence masked by the mask 15.

Figure 1:
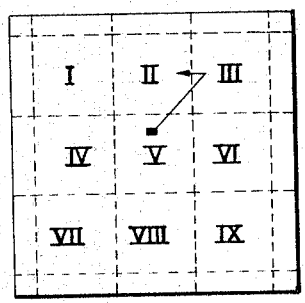
Figure 2:
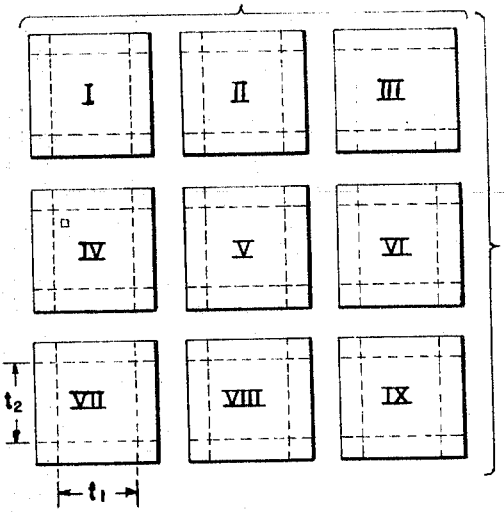
Figure 3A:
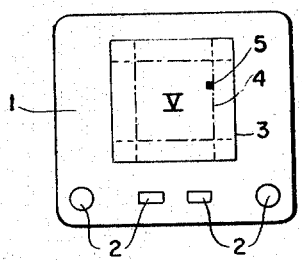
Figure 4A:
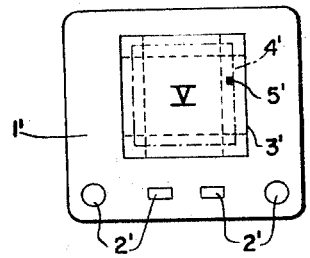
Figure 3B:
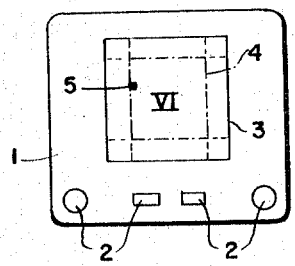
Figure 4B:
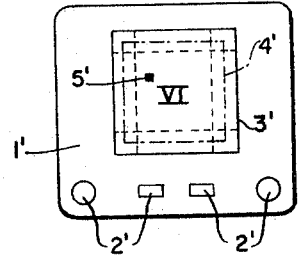
Figure 5:
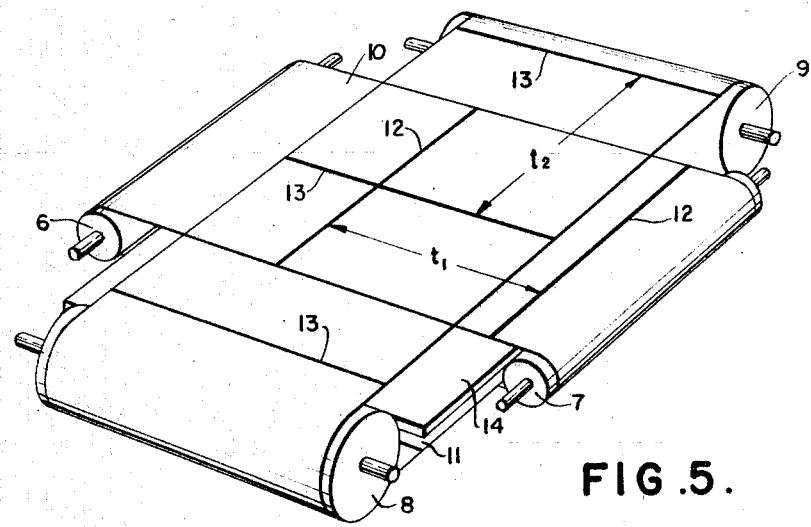

The coaction of the mask with the map sections and the markers will be described in conjunction with a craft which follows the course depicted in FIGURE 1, i.e., a craft which starts out at a point in the upper center of map section V and proceeds on a heading of 45° (northeast) through map section II and into the left-hand center portion of map section III, from whence the craft proceeds on a course of 270° back (due west) into map section II.

Figure 6A:
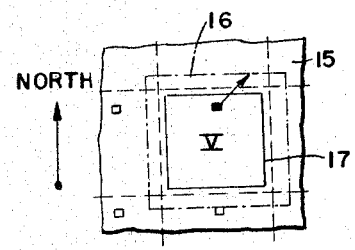
FIGURES 6a, 6b, 6c, 6d, 6e and 6f are schematic views showing six different positions of the masking means, thereby to depict different positions of the masking means with respect to the visible and invisible markers as the craft travels over the geographic area depicted by the map sections.
Figure 6B:
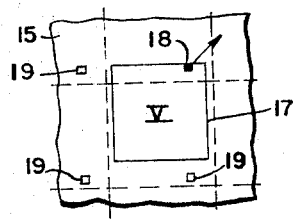
Figure 6C:
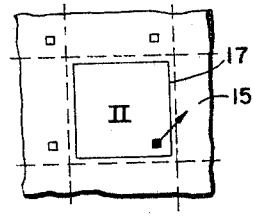
Figure 6D:
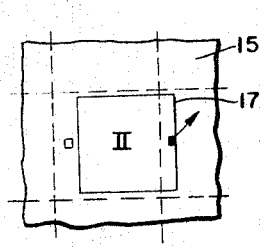
Figure 6E:
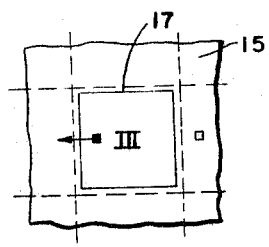
Figure 6F:
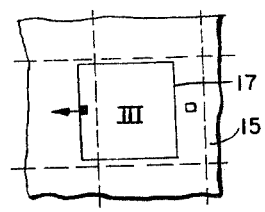

FIGURE 6a shows the starting position of the craft. The arrow shown emanating from the visible marker in FIGURE 6a represents the direction in which the craft is moving. The mask is in its rest position. If, then, the visible marker reaches the upper edge of the sight 17 of the mask, the mask is carried along, under the influence of the belt which itself responds to north-south movement of the craft, in a northerly direction. The visible marker may thus be considered, in a manner of speaking, as pushing the mask 15 ahead, without itself being covered by the mask. However, as soon as the marker reaches the edge of the indicating area 16 (cf. FIGURE 6a) a signal is triggered which initiates the exchange of map sections. This occurs when the parts are as depicted in FIGURE 6b. The map section V is then exchanged for map section II and the mask 15 jumps back into its rest position, as depicted in FIGURE 6c. As a result, the marker which was visible up to now is masked and a new marker, which up to now was invisible, is uncovered. The new marker continues to move in the same direction until it comes to the edge of the sight 17 of the mask 15. Now it will be the east-west belt which carries the mask 15 along, this time in easterly direction, until the marker once comes to the edge of the indicating area 16 (cf. FIGURE 6a). This occurs when the parts are as depicted in FIGURE 6d, whereupon the next quantum of movement of the marker causes the map section II to be replaced by the map section III and the mask jumps back to its rest position to assume the position shown in FIGURE 6e. The heretofore visible marker is now masked, but a new marker, namely, the marker to the left of the now covered marker, becomes visible. The newly uncovered marker will be seen to occupy such position with respect to the map section III as correctly to indicate the geographical position of the craft. The craft now turns to its new course of 270° and crosses the line of demarcation between map sections II and III; this is depicted in FIGURE 6f, in which the east-west belt has already started the leftward (corresponding to westward) movement of the mask 15. The subsequent change-over from map section III back to map section II is not illustrated.

Figure 7:
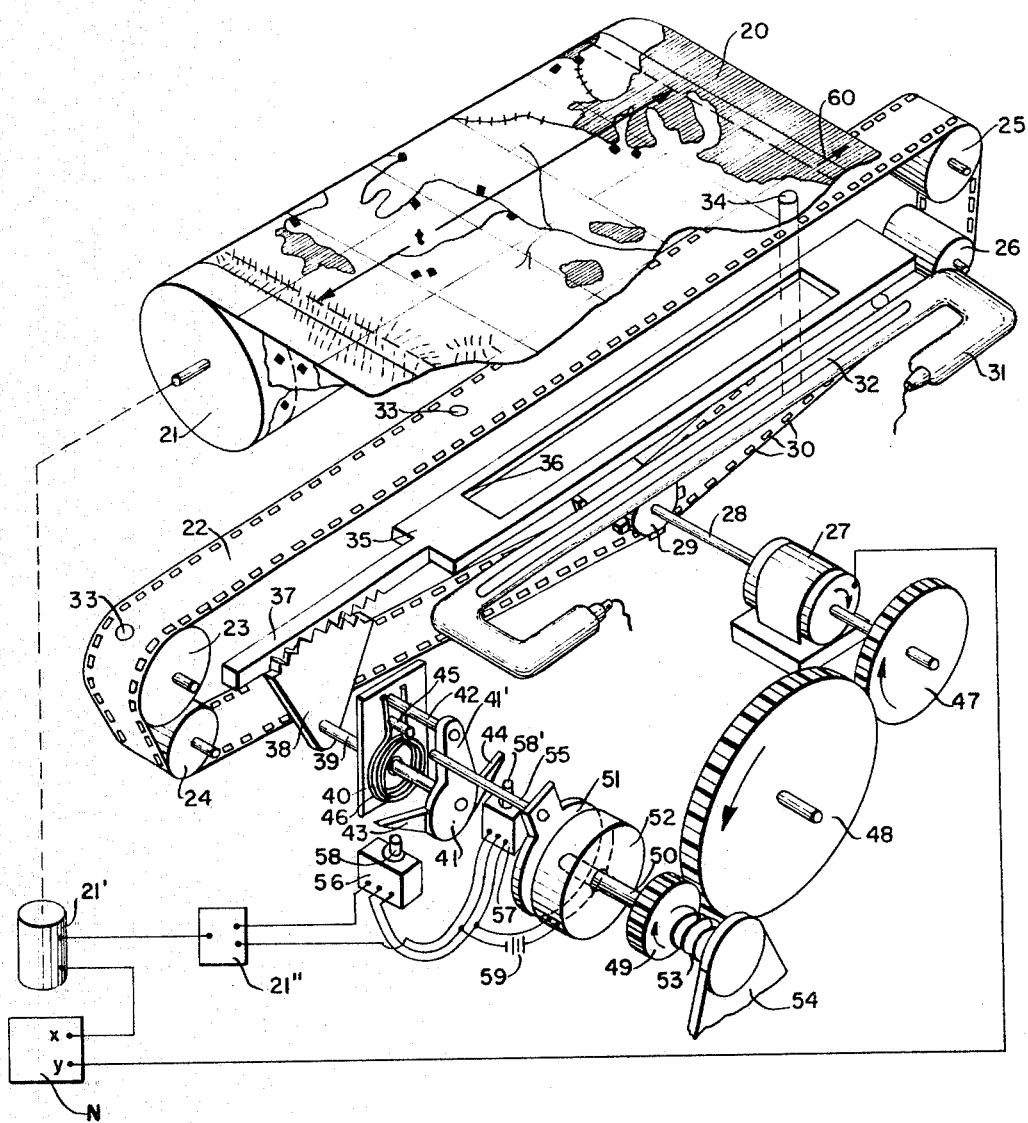
FIGURE 7 is a perspective view of a display device according to the present invention.

While reference has so far been made to display devices having markers moving in two mutually perpendicular directions, the map sections themselves being maintained stationary, FIGURE 7 shows one embodiment of the present invention in which the marker itself is movable in but one direction, the map itself being in the form of a strip 20 which can be wound and unwound from two rollers, one of which is shown at 21, this roller being connected to a reversible drive motor 21′. The strip map as a whole is made up of individual strips the length of each of which is equal to the over-all width of the entire map, and the individual strips are connected together to form the entire strip map. The longitudinal edges of the strips are extended to provide border regions. In this way, all of the map sections may be physically combined into a single, composite strip map, and each map section may be brought into the display area by actuation of the rollers on which the strip map 20 is mounted. Such a map arrangement is shown, for example, in U.S. Patent No. 3,160,851, dated December 8, 1964.

In a map display device incorporating a strip map, movement of the craft along one coordinate, e.g., the coordinate $x$ of a Cartesian coordinate system, $x$, $y$, may be simulated by moving the strip map itself, i.e., by winding and unwinding the strip map from the rollers on which it is carried in response to the $x$ coordinate put out by the navigation computer. This navigation computer, with its coordinate outputs for $x$ and $y$, is shown schematically at N, FIGURE 7 also showing the connection between the output $x$ and the drive motor 21′. Consequently, all that is necessary is that the marker itself be moved in a direction transverse, and preferably at right angles, to the direction of movement of the strip map, this transverse movement of the marker being controlled by the other, or $y$, coordinate put out by the navigation computer, as will be described below. This, then, simplifies the mechanical structure of the marker moving mechanism, and similarly simplifies the mechanical structure of the means which mount the mask that is provided in accordance with the present invention. That is to say, since the marker, e.g., the light spot is itself mounted for movement in but one direction, i.e., the direction transverse to the direction in which the strip map moves, the mask too, need be mounted for movement in but that one direction, rather than be mounted for movement in two dimensions, as explained above in conjunction with FIGURES 6a through 6f.

Thus, the display device of FIGURE 7 comprises, in addition to the strip map 20 and the rollers, an endless opaque belt 22 which passes over four rollers 23, 24, 25, 26. One reach of the belt passes under the strip map 20. A motor 27 having a shaft 28 carrying a double sprocket wheel 29, which engages the perforations 30 along both edges of the belt 22, is provided for moving the belt in either direction, the motor 27 being a reversible motor capable of being driven in either direction, in response to the $y$ coordinate put out by the navigation computer N. Arranged within the loop formed by the endless belt 22 is a neon tube 31 which is surrounded by a coating which itself is opaque except for a narrow slit 32, located at the top of the tube 31, as viewed in FIGURE 7. In practice, the neon tube will be one which is filled with a rare gas and which puts out an intense red light which is directed upwardly toward the belt 22 and the strip map 20.

The belt 22 is provided with a plurality of round openings 33 which are spaced from each other a distance $t$, this being—in the embodiment of FIGURE 7—the width of the strip map minus its borders along the longitudinal edges. The strip map itself is somewhat translucent, so that a light emanating from the neon tube 31 and passing through one of the openings 33 will be seen on the map, when viewed from above, as a light spot 34.

According to the present invention, the display device of FIGURE 7 is provided with a mask 35 in the form of an elongated plate which is movable to and fro in the same direction as the belt 22, i.e., in a direction transverse to the direction of movement of the strip map 20, this mask 35 having an elongated window 36 providing the "sight" through which light coming from the neon tube 31 may pass. The length of the window 36 is equal to the distance $t$, so that only one light spot 34 can be projected onto the strip map 20 at any one time. The mask 35 has an extension 37 in the form of a toothed rack, the same being in mesh with a gear sector 38 which, in turn, is driven by the motor 27, via the mechanism to be described. This mechanism includes a shaft 39 carrying, at one of its ends, the sector 38 and mounted for rotation in a stationary plate 40. The other end of the shaft 39 carries a disc 41, which has a radial arm 41′ carrying a pin 42 and two further arms 43 and 44 which are bent out of the axial plane occupied by arm 41′. The plate 40 carries a short spring abutment pin 45; an omega-shaped spring clip 46 keeps the pins 42 and 45 in radial alignment with each other. This defines the central rest position of the mask 35, the spring clip 46 additionally serving as an energy storing device, in that if the disc 41 is rotated out of its rest position, to the right or left—in a manner which will be described forthwith—the pin 42 carried by the disc 41 will carry along one of the two legs of the spring clip while the other leg is held in place by the pin 45. Consequently, the mask 35 will always return to its original starting or rest position.

The motor shaft 28 also carries a pinion 47 which meshes with an idler gear 48, the latter meshing with a further pinion 49. The pinion 49 is carried by a shaft 50 which itself is non-rotatably connected to an armature disc 51. The shaft is rotatably mounted within the housing of a stationary electromagnet 52. The shaft is also axially displaceable, within such limits, however, that the pinion 49 remains at all times in mesh with the idler gear 48. When the electromagnet 52 is energized, it attracts the armature disc 51, thereby compressing a spring 53 which is interposed between the pinion 49—which itself moves axially with the shaft 50—and a stationary abutment plate 54. When the energization of the electromagnet 52 in interrupted, the unit constituted by the parts 49, 50, 51 is returned to its original position under the influence of the spring 53.

The disc 51 carries a pin 55 which is a drive element that serves to establish a motion-transmitting connection between the disc 51 and the disc 41. With the parts being in the position illustrated in FIGURE 7, the free end of the pin 55 will come to bear against the arm 41' of the disc 41 when the disc 51 is rotated to the right. If, however, the disc 51 were rotated to the left, it could execute almost one complete revolution before the pin 55 would come to bear against the other edge of the arm 41' of the disc 41. In order to avoid any interference on the part of the arms 43 and 44, the same are angled out of the plane of the arm 41', as explained above, thereby to leave a clear path for the pin 55.

The electromagnet 52 is controlled by two microswitches 56 and 57, whose actuating pins 58 and 58' lie in the paths of travel of the arms 43 and 44, respectively. The two switches are so wired in circuit with the electromagnet 52 and an electric power supply, such as a battery 59, as to energize the electromagnet 52 when one of the two switches is engaged by the corresponding arm.

The apparatus operates as follows, it being assumed that the parts are initially in the positions depicted in FIGURE 7.

The craft is assumed to move in such a direction that the visible light point 34 progresses in the direction of the arrow 60. (For purposes of explanation, any movement of the strip 20, which would be in addition to movement of the belt 22, need not be considered, inasmuch as, in the described embodiment, the mask 35 moves only in the direction in which the belt 22 moves.) This movement of the craft is accompanied by a similar movement of the upper reach of the belt 22, and by rotation of the parts 47, 48, 49, in the directions indicated by the arrows. Before, however, in the course of this movement, the light spot 34 is covered by the mask 35 and the next consecutive light spot becomes uncovered, the pin 55 comes to bear against the side of the upwardly extending arm 41' of the disc 41, thereby to carry along this disc and to start its rotation in clockwise direction. As a result, the spring clip 46 is tensioned, while at the same time the shaft 39, and with it the sector 38, will be rotated, thereby to move the mask 35 rightwardly, as a result of which the light spot 34 remains visible. The light spot continues to move in the direction of the arrow 60, beyond the dashed line depicting the limit of the width $t$ of the strip map, i.e., the limit of the map section proper minus its border region, so that the light spot will in fact enter this border region. In the course of this movement, however, the arm 44 of the disc 41 will come into contact with the pin 58' of the microswitch 57, and actuate this switch. This, then, energizes the electromagnet 52 which, in turn, attracts the armature disc 51. As a result, the pin 55 is withdrawn axially out of engagement with the arm 41' of the disc 41, so that this disc is now free to rotate under the influence of the spring clip 46 which up to now was in the process of being tensioned, so that the disc 41 returns to its rest position. In this way, the mask 35 is returned abruptly into its rest position. Consequently, the light spot 34 will be covered but the next opening 33—which up to now was covered—will be uncovered, so that a new light spot will appear on the strip map 20. This newly uncovered opening 33 will, in the meanwhile, have come into a position in which it is within the limits of the strip map, i.e., within the distance $t$, so that the new light spot occupies a position which, with respect to the previous light spot, is set back the distance $t$.

At the same time as the light spot is set back, the signal will be triggered which causes the rollers 21 to put a new map section into the display area, so that the new light spot will accurately indicate the geographic position of the craft. This signal for placing a new map section in the display area may likewise be derived from the microswitches 56, 57, which for this purpose, may be provided with additional contacts and with connections leading to the motor 21' via a control box 21". The mechanism may thus also function as a directional switch for causing a new map section to be placed in view.

After the new light spot has come into view, the electromagnet 52 is de-energized, since the arm 44 is no longer in contact with the pin 58' of the microswitch 57. The pin 55 can freely turn about the disc 41 and will not again contact the same until the light spot once more reaches the end of the window 36. If, on the other hand, the craft changes its direction shortly after the new map section has been put into place, the pin 55 will immediately engage the right side of the arm 41' of the disc 41 and carry it along to the left. The rotation of the disc 41 continues until the arm 43 engages the pin 58 of the microswitch 56, thereby once again energizing the electromagnet 52 and thus to release the disc 41, which is then free to return to its rest position under the influence of the spring clip 46 which has been stressed in the course of this leftward rotation of the disc 41.

It will thus be seen that, in accordance with the present invention, the mask, which is mounted so as to sweep the entire indicating area or, in the case of a mask which is to be effective in but one dimension, the entire length in which the particular coordinate is to be indicated, avoids more than one marker being seen at any one time. In practice, the moving mechanism for the mask can be kept relatively uncomplicated by making the size of the window equal to the size of the map section proper, or, in the case of a one-dimensional masking effect, to make the length of the window 36 equal to $t$, as explained above. It is, however, also possible to make the window longer or shorter than $t$, provided the drive mechanism for the mask is properly geared up or down. The more the size of the mask window differs from the optimum, the greater has to be the degree of freedom of movement afforded to the mask.

It will also be appreciated that thanks to the above-described spring mechanism, i.e., the mechanism which allows the mask to jump back into its rest position, the observer is given the definite impression that the old marker itself "jumps back" into a new position.

It will be understood that the above description of the present invention is susceptible to various modifications, changes and adaptations, and the same are intended to be comprehended within the meaning and range of equivalents of the appended claims.

What is claimed is:
1. A map display device comprising, in combination:
 (a) means for displaying any one of a plurality of map sections each of which has an overlap border which depicts portions of adjacent map sections, each map section having, in a given direction and exclusive of it overlap border, a predetermined length $t$;
 (b) means for producing a plurality of markers, spaced from each other, in said given direction, a distance equal to $t$, and for bringing said markers into registration with a map section being displayed by said display means;
 (c) means for moving said marker means, in said given direction, a distance greater than $t$, thereby to make it possible for more than one marker at a time to be brought into registration with a map section being displayed by said display means; and
 (d) masking means movable in said given direction and operatively connected with said moving means for preventing more than one marker at a time from being shown on a map section which is displayed by said display means.

2. A map display device as defined in claim 1 wherein said means for producing said markers comprise means for producing light spots and wherein said masking means comprise a mask which has an opening and which is interposed between said means for producing the light spots and a map section displayed by said display means.

3. A map display device as defined in claim 2 wherein said masking means further comprise drive means interconnecting said mask and said moving means for moving said mask.

4. A map display device as defined in claim 3 wherein said mask normally occupies a rest position and wherein said drive means are a means for moving said mask out of its rest position when a light spot which is projected on a map section displayed by said display means is moved outside of that portion of said map section which is within said length $t$.

5. A map display device as defined in claim 4 wherein said opening of said mask, when said mask is in its rest position, is in alignment with said distance $t$.

6. A map display device as defined in claim 4 wherein said opening is an elongated opening extending in said given direction.

7. A map display device as defined in claim 6 wherein the length of said opening is equal to $t$.

8. A map display device as defined in claim 4 wherein said drive means include spring means for abruptly returning said mask from an extreme actuated position back into its rest position when the light spot has been moved a predetermined distance outside of said portion of said map section.

9. A map display device as defined in claim 8 wherein said means for producing light spots comprise a light source and an opaque endless belt mounted with one reach thereof coextensive with said given direction and between said light source and the map section, said belt being provided with openings which are spaced said distance $t$ from each other, in the direction of the length of said belt; wherein said mask is interposed between said light source and said map section, said mask being provided with an elongated opening extending in said given direction; and wherein said drive means which interconnect said mask and said moving means comprise a drive element for moving said mask out of its rest position when a light spot is projected on said map section outside of said portion thereof.

10. A map display device as defined in claim 9 wherein said drive element coacts with said spring means for tensioning the same until the light spot has been moved said predetermined distance outside of said portion of said map section, thereafter to disengage from said spring means thereby to allow the now-tensioned spring means to return said mask to its rest position.

11. A map display device as defined in claim 9 wherein said light source comprises a neon lamp filled with a rare gas.

12. A map display device as defined in claim 8 wherein said means for producing light spots comprise a light source and an opaque endless belt mounted with one reach thereof coextensive with said given direction and between said light source and the map section, said belt being provided with openings which are spaced said distance $t$ from each other, in the direction of the length of said belt; wherein said mask is interposed between said light source and said map section, said mask being provided with an elongated opening extending in said given direction; and wherein said drive means which interconnect said mask and said moving means move said mask out of its rest position when a light spot is projected on said map section outside of said portion thereof, said drive means comprising: a toothed rack connected to said mask and extending in said given direction; a gear sector in mesh with said toothed rack; a first disc rotatably connected with said sector, said first disc having a radial arm carrying an axially extending first pin; a fixedly mounted spring clip having two arms and constituting said spring means, each of said arms engaging a stationary pin and each being engageable by said first pin; a second disc mounted for rotation and carrying an axially extending second pin, said second disc also being mounted for axial movement between an operative position in which a free end of said second pin is in axial alignment with said radial arm of said first disc, thereby enabling said second pin, upon rotation of said second disc, to rotate said first disc and with it said gear sector, and an inoperative position in which said free end of said second pin is out of axial alignment with said radial arm; a spring for continuously urging said second disc axially into its operative position; electromagnetic means for moving said second disc axially out of its operative position and into its inoperative position against the action of said spring; means for energizing said electromagnetic means and including two switches upon the actuation of either of which said electromagnetic means are energized; two further radial arms carried by said first disc for energizing respective ones of said two switches after said first disc has been rotated through a given angle, in either direction; motor means for moving said endless belt; and means connected to said motor means as well as to said second disc for rotating said second disc, irrespective of its axial position, through an angle which is proportional to the linear distance which said reach of said belt is moved by said motor means.

13. A display device as defined in claim 12 wherein said display means include a strip map made up of individual map sections, roller means for moving different ones of said map sections, transversely to said given direction, into positions in which they are displayed, and second motor means for actuating said roller means; and wherein said two switches are connected to said second motor means for causing a different map section to be displayed when a respective one of said switches is actuated.

14. A map display device as defined in claim 13, further comprising a navigation computer having $x$ and $y$ outputs at which appear values representative of two coordinates $x$, $y$, said $x$ output being connected to one of said two motor means and the $y$ output being connected to the other of said two motor means.

15. In a map display device, the combination which comprises:
  (a) an endless opaque belt having openings along its length spaced a predetermined distance apart;
  (b) roller means mounting said belt;
  (c) motor means for moving said endless belt;
  (d) an elongated light source arranged next to one reach of said belt;
  (e) an elongated mask interposed between said light source and said reach of said belt, said mask being provided with an elongated opening whose length is equal to said predetermined distance; and
  (f) means for moving said mask in the direction of its length, said moving means including:
    (1) a toothed rack connected to said mask and also extending in said direction;
    (2) a gear sector in mesh with said toothed rack;
    (3) a first disc rotatably connected with said sector, said first disc having a radial arm carrying an axially extending first pin;
    (4) a fixedly mounted spring clip having two arms, each engaging a stationary pin and each being engageable by said first pin;
    (5) a second disc mounted for rotation and carrying an axially extending second pin, said second disc also being mounted for axial movement between an operative position in which a free end of said second pin is in axial alignment with said radial arm of said first disc, thereby enabling said second pin, upon rotation of said second disc, to rotate said first disc and with it said gear sector, and an inoperative position in which said free end of said second pin is out of axial alignment with said radial arm;

(6) a spring for continuously urging said second disc axially into its operative position;

(7) electromagnetic means for moving said second disc axially out of its operative position and into its inoperative position against the action of said spring;

(8) means for energizing said electromagnetic means and including two switches upon the actuation of either of which said electromagnetic means are energized;

(9) two further radial arms carried by said first disc for energizing respective ones of said two switches after said first disc has been rotated through a given angle, in either direction; and

(10) means connected to said motor means as well as to said second disc for rotating said second disc, irrespective of its axial position, through an angle which is proportional to the linear distance which said reach of said belt is moved, by said motor means.

References Cited by the Examiner

UNITED STATES PATENTS

| | | | |
|---|---|---|---|
| 2,136,181 | 11/1938 | Courtois-Suffit | 40—42 |
| 3,160,851 | 12/1964 | Ramsayer et al. | 340—24 |
| 3,208,336 | 9/1965 | Vago | 35—10.2 X |

FOREIGN PATENTS

| | | |
|---|---|---|
| 685,467 | 12/1939 | Germany. |
| 928,468 | 6/1963 | Great Britain. |

JEROME SCHNALL, *Primary Examiner.*